United States Patent Office 3,645,907
Patented Feb. 29, 1972

3,645,907
COMPOSITION PREPARED BY TREATING DIAMINE-KETONE MIXTURES WITH CALCIUM CARBIDE
William E. Jackson, Akron, Ohio, assignor to The Goodyear Tire & Rubber Company, Summit, Ohio
No Drawing. Filed Aug. 25, 1969, Ser. No. 869,984
Int. Cl. C08g 22/04, 51/84
U.S. Cl. 252—182                                    3 Claims

ABSTRACT OF THE DISCLOSURE

A composition and method of preparation which comprises treating a mixture of a diamine having primary amino groups and liquid ketone with calcium carbide and a method of curing a polyurethane therewith. The composition and method are particularly useful in the preparation of curatives for polyurethane.

---

This invention relates to a method of reducing the chemical reactivity of a diamine and, more particularly, it relates to a method of controlling the reaction rate of a diamine and an isocyanate-terminated polyurethane in preparing cured polyurethanes.

Mixtures prepared from diamines and ketones are useful in the preparation of various materials. They are particularly useful for preparing cured polyurethanes by reacting various diamine curing agents, particularly where the amino groups of the diamines are attached to nonbenzenoid carbon atoms, with various isocyanate-terminated polyurethanes.

The various diamines can be chosen to react with various selected isocyanate-terminated polyurethanes to cure the polyurethanes at different rates ranging from fast curing rates such as a few seconds, or practically instantaneously, to very slow curing rates, such as several hours or more. In many applications, it is desired to react the diamines in ketone solvents with the isocyanate-terminated polyurethanes. However, it has been found that such curatives generally cure the various isocyanate-terminated polyurethanes at rates too fast to be generally commercially useful. This difficulty has been particularly evident when the amino group of the diamines used to prepare the polyurethanes are attached to nonbenzenoid carbon atoms.

Therefore, it is an object of this invention to provide a method of reducing the chemical activity of the various diamines.

In accordance with this invention, it has been discovered that a method of reducing the chemical activity of a diamine comprises treating a mixture of at least one diamine having primary amino groups and a liquid ketone with calcium carbide. In further accordance with this invention, it has been discovered that a method of reducing the reaction rate of a reaction mixture prepared by mixing a curative mixture of a diamine having primary amino groups and liquid ketone with an isocyanate-terminated polyurethane, comprises first treating the amine-ketone mixture with calcium carbide, removing the calcium carbide residue from the mixture and reacting the treated curative mixture with at least one isocyanate-terminated polyurethane. The methods particularly comprise controlling the reduction of reactivity of the diamine through monitoring the evolution of gaseous acetylene. Through such monitoring it can be determined when the treatment or reaction is substantially complete, or the treatment can be stopped in an intermediate stage with an intermediate reduction in reactivity or reaction rate of the diamine or diamine mixture.

It is also generally preferred that the carbon-to-oxygen ratio of the liquid ketone is from 2.5 up to about 7, and that the carbon-to-nitrogen ratio of the diamine is from 1 up to about 7, although suitable carbon-to-nitrogen ratios can be found, particularly with aliphatic diamines, up to at least 18. In the practice of this invention it is usually more preferred that the carbon-to-oxygen ratio of the liquid ketone is from 3 to 6.

Various diamines can be treated in the practice of this invention. Particularly applicable diamines are diamines wherein the amino groups of the diamines are attached to nonbenzenoid carbon atoms, particularly primary diamines, are aliphatic diamines, cycloaliphatic diamines, and aryl aliphatic diamines. Exemplary of the diamines are ethylene diamine, the propylene diamines, hexamethylene diamine, isophorone diamine, 1,4-cyclohexane bis methylamine, 4,4'-diaminodicyclohexylmethane and m-xylylene diamine. Other diamines include aromatic diamines such as m- and p-phenylene diamine, o- and m-dichlorobenzidine, 2,5-dichlorophenylene diamine, 3,3'-dichloro-4,4'-diamino-diphenyl methane, dianisidine, 4,4'-diamino-diphenyl methane, the naphthylene diamines, tolylene-2,4-diamine, p-aminobenzyl aniline, and o- and p-aminodiphenyl-amine.

Various ketones can be used in this invention for the aliphatic diamine-ketone mixture. Suitable ketones are ketones which are liquid at about 25° C., have carbon-to-oxygen ratios of from 2.5 to about 7, and have from 3 to about 7 carbon atoms. Representative examples of the ketones are acetone, methyl ethyl ketone, methyl isobutyl ketone, diisobutyl ketone, methyl isoamyl ketone and diacetone alcohol.

In the practice of this invention usually sufficient amounts of the ketone are added to the diamine to disperse or dissolve the diamine. Generally from about 1 to about 10 parts of ketone are used per part of diamine although more or less amounts can be used. Preferably, from about 50 to about 115 percent of a stoichiometric amount of ketone is used based on the diamine. A slight excess if typically used for maximum retardation of activity.

The mixture of diamine and ketone can be treated with the calcium carbide over a wide temperature range such as from about 20° C. to about 100° C., or higher depending upon the mixture's boiling point. It is an important feature that the mixture resulting from the diamine and ketone be vigorously refluxed in the presence of the calcium carbide. The treatment can be conducted at atmospheric pressure or above or below atmospheric pressure although at least the autogenous pressure of the mixture is used. Generally, although it is not required, the calcium carbide is used in particulate form. The diamine-ketone mixture is typically treated with the calcium carbide in an amount of from about 0.1 to about 1.5 parts by weight and higher of calcium carbide per part of the diamine-ketone mixture where the amount of calcium carbide can be adjusted to provide various intermediate degrees of treatment. The treatment can last for about 2 hours or up to about a day or more, if desired. Usually about 3 to about 7 hours is sufficient, particularly under reflux conditions. The calcium carbide residue is then removed from the mixture by decanting, filtering, or other suitable means and the diamine-ketone mixture can be used immediately after its treatment or stored under anhydrous conditions for later use.

The isocyanate-terminated polyurethanes used in this invention are products of polyurethane reaction mixture comprising reactive hydrogen-containing polymeric materials and polyurethane organic polyisocyanates. Usually a solvent can be added to the polyurethane reaction mixture so that it will be in the form of a fluid mixture or solution. If a solvent is to be used, generally sufficient solvent is added to form a solution containing from about 40 to about 65 percent solids. However, a higher or lower concentration of solids can be used. When the solids concentration is low, the individual application will deposit a thin layer of the polyurethane polymer and a large amount of the solvent will have to be removed during the curing process. A solids concentration of 45 percent or higher is generally desired.

The reactive hydrogen-containing polymeric material used to prepare the polyurethane comprises at least one member selected from castor oil and the group consisting of polyester polyols, polyester-amides, polyether polyols and dihydroxy-terminated polymers and copolymers of conjugated diene hydrocarbons. The reactive hydrogen-containing material generally used has a molecular weight between about 700 and about 5000 and, usually between about 1000 and about 3000. Generally, the polyether polyols are the preferred active hydrogen containing material where high strength and solvent resistance are desired.

Representative examples of polyester polyols are the condensation products of low molecular weight polyols with an organic polycarboxylic acid or anhydride. Representative low molecular weight polyols are glycols such as ethylene glycol, propylene glycol, butylene glycol, pentylene glycol, decamethylene glycol, etc. Representative examples of the organic dicarboxylic acids that can be used are succinic acid, glutaric acid, adipic acid, phthalic acid, terephthalic acid, isophthalic acid, suberic acid, sebacic acid, pimelic acid and azelaic acid. The anhydrides of such acids can be used in place of the acid. If desired, from about one to 20 percent by weight of a triol or higher polyfunctional polyol or polyfunctional acid can be present to produce branching in the polyurethane polymer.

Polyether polyols useful in preparing the polyurethanes of this invention can be prepared by polymerizing or copolymerizing alkylene oxides such as ethylene oxide, propylene oxide and butylene oxides by polymerizing or copolymerizing the low molecular weight glycols, or by the reaction of one or more such alkylene oxides with the glycols or with triol, or with a polycarboxylic acid such as phthalic acid. The polyether polyols include polyalkylene-aryl ether glycols or triols, polytetramethyene ether glycols, polyalkylene ether-thioether glycols or triols, and alkyd resins. Generally, the polytetramethylene ether glycols are the preferred polyether glycols.

Representative examples of dihydroxy - terminated polymers of conjugated diene hydrocarbons are typically polymers of 1,3-butadiene, polymers of isoprene, their copolymers, copolymers of 1,3-butadiene and styrene, copolymers of 1,3-butadiene and acrylonitrile, copolymers of 1,3-butadiene and ethyl acrylate and copolymers of 1,3-butadiene and chloro-1,3-butadiene. Particularly useful polymers are polybutadiene, polyisoprene and copolymers of butadiene-isoprene, butadiene-styrene and butadiene-acrylonitrile. These hydroxy terminated polymers typically have a hydroxyl functionally greater than 2.0 up to about 3.0 and it is generally preferred that their hydroxy functionality is from about 2.1 to about 2.5. They typically have a viscosity at about 30° C. of from about 10 poise to about 150 poise and more generally from about 20 poise to about 100 poise.

Polyesteramides may be prepared by reacting a diamine, a glycol, and a dicarboxylic acid under conditions which will remove the water of condensation. Representative glycols and dicarboxylic acid useful in preparing polyesteramides are those useful in preparing polyesters, examples of which have already been shown. Various diamines may be used in forming the polyesteramides, representative of which are ethylene diamine, hexamethylene diamine, decamethylene diamine, cyclohexyldiamine, phenylene diamine, methylene dianiline, toluidine diamine, dichlorobenzidine and methylene-bis-chloroaniline.

Various aliphatic, alicyclic and aromatic organic polyisocyanates can be used to prepare the organic polyisocyanates are diisocyanates having isocyanato groups attached to nonbenzenoid carbon atoms examples of which are aliphatic and alicyclic organic diisocyanates. Representative examples of polyisocyanates include 1,6-hexamethylene diisocyanate, 1,10-decamethylene diisocyanate, 1,4-cyclohexylene diisocyanate, 4,4'-methylene-bis(cyclohexylisocyanate) and 1,5 - tetrahydronaphthalene diisocyanate, isophorone diisocyanate, the 2,4- and 2,6-toluene diisocyanates, m-phenylene diisocyanate, diphenylmethane-4,4' - diisocyanate, hydrogenated diphenylmethane-4,4'-diisocyanate, and 3,3'-dimethyl-4,4'-bis phenylene diisocyanate, as well as polyalkylene-polyarylene isocyanates as more particularly referred to in U.S. Pat. 2,683,730.

The isocyanate terminated polyurethanes are usually prepared by reacting a reactive hydrogen containing polymeric material with the organic polyisocyanate such that the ratio of isocyanato groups to the reactive hydrogen-containing groups of the reactive hydrogen-containing polymeric material is from about 1.1/1 to about 5/1 and preferably about 1.2/1 to about 2.5/1. They are generally reacted at temperature from about 20° C. to about 150° C. The reactive hydrogens are supplied by hydroxyl groups and amino groups. Other methods known to those skilled in the art of preparing isocyanate terminated polyurethanes with or without solvents being present may also be used.

Any of the nonreactive solvents, i.e. inert to diamines, ketones, etc. normally used in making paints which are suitable for spraying are useful as diluents for the isocyanate-terminated polyurethanes of this invention. Representative examples of these are benzene, toluene, the paraffinic naphthas, the naphthenic naphthas, the aromatic naphthas, ethyl formate, propyl formate, butyl formate, amyl formate, ethyl acetate, propyl acetate, methyl acetate, butyl acetate, amyl acetate, acetone, methyl ethyl ketone, diethyl ketone, methyl isoamyl ketone, cellosolve acetate, dioxane, lower nitroparaffins, trichloroethylene, methylene chloride, etc. Mixtures of solvents may be used to obtain satisfactory spreading properties and evaporation rates, particularly when the polyurethane is to be used as a spray composition and applied to a suitable surface.

The isocyanate-terminated polyurethane, sometimes called a prepolymer, is usually dissolved or dispersed in the solvent to form a solution or dispersion which is then reacted with the treated diamine-ketone mixture to form a cured polyurethane. The diamine is usually added to the isocyanate-terminated polyurethane in a ratio of from about 0.5/1 to about 1.5/1 and, preferably, about 0.8/1 to about 1.0/1 amine groups of the diamine for each isocyanate group in excess of the reactive hydrogen groups of the reactive hydrogen-containing polymeric material and reacted at a temperature of from about 20° C. to about 150° C. although more preferably below the boiling point of the solvent, if used, such as from about 20° C. to about 50° C.

The following illustrative examples are set forth to further exemplify the objects and advantages of the invention. The parts and percentages are by weight unless otherwise indicated.

EXAMPLE I

In a reactor a curative mixture was prepared by mixing 40 parts of ethylene diamine, 88 parts of acetone, 96 parts of toluene and 171 parts of calcium carbide in lump form. The reactor was placed in a heating mantle and the reactants heated to reflux. The reaction was monitored by observing acetylene gas evolution through a bubbler. After six hours the gas evolution had essentially stopped therefore indicating that the reaction was essentially complete. The reaction product, a clear solution having a yellow tint was quickly and easily separated from the calcium carbide residue and the solid byproducts by vacuum filtration through a Büchner funnel. The calcium carbide residue and the solid byproducts caused very little restriction in the filter.

A polyurethane prepolymer was prepared by heating 21.5 parts of 4,4′-dicyclohexylmethane diisocyanate to about 90° C. and mixed with 54 parts of a mixture of 1,4-butanediol adipate polymers having molecular weights of about 2000 and about 1000 with corresponding hydroxyl numbers of about 56 and about 112 which had been preheated to about 90° C. The reaction was allowed to continue for about 50 minutes at about 120° C. and then degassed for about 45 minutes at a reduced pressure of about 28 inches of mercury. This prepolymer was then dissolved in 75 parts of dichloromethane to yield a mixture containing about 50 percent solids.

To 100 parts of the diluted polyurethane prepolymer was added about 10–15 parts of the curative solution with good mixing at about 25° C. to form a polyurethane reaction mixture having a pot life of from about 10 to about 15 minutes. Such reaction mixtures prepared without treating the diamine-ketone mixture with calcium carbide typically have an instantaneous set-up time or essentially no pot life. Sheets of the reaction mixture prepared according to this invention were prepared by spraying and allowed to dry and cool at about 25° C. for about three hours to form a cured polyurethane.

EXAMPLE II

In a reactor a curative mixture was formed by adding 123.2 parts acetone, 21.6 parts p-phenylene diamine and 25.6 parts calcium carbide in lump form. The reactor was then placed in a heating mantle and the reactants heated to reflux. The reflux was continued for about six hours until a significant color change was observed (a very dark maroon color). The mixture was allowed to cool and the solution was quickly and easily separated from the calcium carbide residue and solid byproducts by vacuum filtration through a Büchner funnel. To 100 parts of the diluted polyurethane prepolymer prepared according to the method of Example I by mixing the prepolymer with dichloromethane was added about 10 parts of the curative solution to form a reaction mixture having a pot life of from about 10 to about 15 minutes. Such reaction mixtures prepared without treating the diamine-ketone mixture with calcium carbide typically have a practically instantaneous set-up time or practically no pot life. Sheets of the reaction mixture were formed and cured at about 25° C. for several hours to form a cured polyurethane.

Pot life is a period of time used by those skilled in the art to designate the period of time between when the curing agent is added to the isocyanate-terminated polyurethane and when the resulting reaction mixture has cured or gelled to the extent that it cannot be brushed or sprayed by conventional methods to form a smooth film.

In these examples a typical grade of calcium carbide was used. Typically, calcium carbide is prepared by heating a powdered mixture of quick lime, or calcium oxide, and coke in an electric furnace. The endothermic reaction produces a product normally comprising from about 70 percent to about 85 percent by weight, and usually about 80 percent, calcium carbide with the remainder being primarily calcium oxide.

In this specification it is exemplified that the calcium carbide facilitates a method of controlling the extent of treatment of a diamine-ketone mixture with the calcium carbide, particularly during reflux conditions through monitoring the evolution of gaseous acetylene and making appropriate adjustments in reaction conditions therefrom. It also exemplifies such a monitoring method of controlling the reduction in activity of a diamine-ketone curative for curing isocyanate-terminated polyurethanes.

While certain representative embodiments and details have been shown for the purpose of illustrating the invention, it will be apparent to those skilled in this art that various changes and modifications may be made therein without departing from the spirit or scope of the invention.

What is claimed is:

1. A method of reducing the chemical activity of a mixture prepared by mixing a diamine having its amino groups attached to nonbenzenoid carbon atoms and a liquid ketone containing 3 to 7 carbon atoms and having a carbon-to-oxygen ratio of from about 2.5 to 7 which comprises treating the said mixture with about 0.1 to about 1.5 parts by weight of said mixture of calcium carbide at about reflux conditions for about 2 to about 24 hours and monitoring the extent of chemical activity reduction by the evolution of gaseous acetylene.

2. The method according to claim 1 where the diamines are selected from ethylene diamine, 1,2-propylene diamine, 1,3-propylene diamine, hexamethylene diamine, isophorone diamine, 1,4-cyclohexane bis methyl amine, 4,4′-diamino dicyclomethane, m- and p-xylene diamine, o- and m-dichlorobenzidine, m- and p-phenylene diamine, 2,5-dichlorophenylene diamine, 3,3′-dichloro-4,4′-diamino diphenyl methane, dianisidine, 4,4′-diamino diphenyl methane, the naphthylene diamines, tolylene, 2,4-diamine, p-aminobenzyl aniline, and o- and p-amino diphenylamine, and where the ketones are selected from acetone, methyl ethyl ketone, methyl isobutyl ketone, diisobutyl ketone, methyl isoamyl ketone and diacetone alcohol.

3. A composition derived from a diamine having its amino groups attached to nonbenzenoid carbon atoms and a liquid ketone which has a reduced chemical activity prepared by the method of claim 1.

References Cited

UNITED STATES PATENTS 3,463,748   8/1969   Scheibelhoffer _____ 260—18 R

OTHER REFERENCES

The Condensed Chemical Dictionary, 1961, sixth edition, p. 199.

LEON D. ROSDOL, Primary Examiner

I. GLUCK, Assistant Examiner

U.S. Cl. X.R.

252—194, 401; 260—2.5 AT, 75 TN, 77.5 AM, 77.5 AP, 77.5 AQ

UNITED STATES PATENT OFFICE
CERTIFICATE OF CORRECTION

Patent No. 3,645,907        Dated February 29, 1972

Inventor(s) William E Jackson

It is certified that error appears in the above-identified patent and that said Letters Patent are hereby corrected as shown below:

Column 1, the heading of the patent which now reads:

3,645,907
COMPOSITION PREPARED BY TREATING DI-
AMINE-KETONE MIXTURES WITH CALCIUM
CARBIDE
William E Jackson, Akron, Ohio, assignor to The
Goodyear Tire & Rubber Company, Summit, Ohio
No Drawing, Filed Aug 25, 1969, Ser No 869,984
Int. Cl. C08g 22/04, 51/84
U.S. Cl. 252--182                                3 Claims should read:

3,645,907
COMPOSITION PREPARED BY TREATING DI-
AMINE-KETONE MIXTURES WITH CALCIUM
CARBIDE
William E Jackson, Akron, Ohio, assignor to The
Goodyear Tire & Rubber Company, Akron, Ohio 44316
No Drawing, Filed Aug 25, 1969, Ser. No. 869,984
Int. Cl. C08g 22/04, 51/84
U. S. Cl. 252--182                               3 Claims Signed and sealed this 8th day of August 1972.

(SEAL)
Attest:

EDWARD M. FLETCHER, JR.          ROBERT GOTTSCHALK
Attesting Officer                Commissioner of Patents